(12) United States Patent
Soll et al.

(10) Patent No.: US 8,230,627 B2
(45) Date of Patent: Jul. 31, 2012

(54) DECORATIVE BICYCLE FRAME

(76) Inventors: Johnathan Soll, Cherry Hill, NJ (US); Amanda Soll, Cherry Hill, NJ (US)

( * ) Notice: Subject to any disclaimer, the term of this patent is extended or adjusted under 35 U.S.C. 154(b) by 0 days.

(21) Appl. No.: 11/871,734

(22) Filed: Oct. 12, 2007

(65) Prior Publication Data

US 2009/0094868 A1    Apr. 16, 2009

(51) Int. Cl.
  *G09F 21/04* (2006.01)
(52) U.S. Cl. ........ 40/590; 280/288.4; D12/114; 434/408
(58) Field of Classification Search ............... 40/590, 40/594; 280/288.4; D12/114; 434/408
  See application file for complete search history.

(56) References Cited

U.S. PATENT DOCUMENTS

| | | | | |
|---|---|---|---|---|
| 3,997,184 | A * | 12/1976 | Riti ............................ | 280/288.4 |
| 4,045,077 | A * | 8/1977 | DeVone ....................... | 296/78.1 |
| 4,068,858 | A * | 1/1978 | Harrison et al. ............ | 280/288.4 |
| 5,040,296 | A * | 8/1991 | Yerger ......................... | 30/81 |
| 5,511,822 | A * | 4/1996 | Wolanski ..................... | 280/770 |
| 5,622,389 | A * | 4/1997 | Courtney ..................... | 283/81 |
| 2001/0037594 | A1* | 11/2001 | Bohen .......................... | 40/594 |
| 2004/0239145 | A1* | 12/2004 | Hinton ......................... | 296/147 |
| 2006/0277803 | A1* | 12/2006 | Cotta et al. ................... | 40/209 |

FOREIGN PATENT DOCUMENTS

JP    10138982 A  *  5/1998

OTHER PUBLICATIONS

"The Bilge Pumps Ribbon Magnet Gallery," http://thebilgepumps.com/magnetgallery.htm, Sep. 26, 2006.*
"Bicycle Patrol Program," Collin County Community College, http://web.archive.org/web/20060909123838/http://www.ccccd.edu/campuspolice/bicyclepatrol.htm, Sep. 9, 2006.*
"Embossable & Write-on Aluminum Decals," http://web.archive.org/web/20060317171101/http://www.needdecals.com/aluminum.html, Mar. 17, 2006.*
"rollin with radio 3," http://www.flickr.com/photos/duchamp/157112441/, May 31, 2006.*
"Singletrack," http://www.singletrackworld.com/article.php?sid=2153, Sep. 27, 2006.*

* cited by examiner

*Primary Examiner* — Gary Hoge
(74) *Attorney, Agent, or Firm* — Fox Rothschild LLP; Gerard P. Norton; Perry M. Fonseca

(57) ABSTRACT

Kits for decorating a bicycle frame are provided. In one embodiment, the kits may comprise a decal, a bicycle frame, and an attachment point disposed on the frame wherein the decal is adopted to be removably attached to the bicycle frame at the attachment point. Alternatively, the kits may comprise a bicycle frame, and a decorable surface affixed to the bicycle frame wherein the surface is adopted to receive removable decorations.

14 Claims, 3 Drawing Sheets

DECORATIVE BICYCLE FRAME

FIELD OF THE INVENTION

The present invention relates to kits for applying removable decorations to bicycle frames.

BACKGROUND OF THE INVENTION

Young children are always full of energy, and thus, like being involved in different physical activities. One of their favorite activity is riding a bike. Children are also highly creative and enjoy decorating and customizing their toys. Their tastes, styles, and interests, however, change constantly. Accordingly, they may want to be have flexibility to alter the designs of their toys. There is a need for children products that allow children to enjoy their favorite physical activities while further developing their creativity.

SUMMARY OF INVENTION

In one aspect, kits for decorating a bicycle comprise a decal, a bicycle frame, and an attachment point disposed on the frame wherein the decal is adopted to be removably attached to the bicycle frame at the attachment point.

In another aspect, kits for decorating a bicycle comprise a bicycle frame, and a decorable surface affixed to the bicycle frame wherein the surface is adopted to receive removable decorations.

DETAILED DESCRIPTION

In one aspect, kits for decorating a bicycle are provided. Such kits comprise a decal, a bicycle frame, and an attachment point disposed on the frame wherein the decal is adopted to be removably attached to the bicycle frame at the attachment point.

Figure 1:
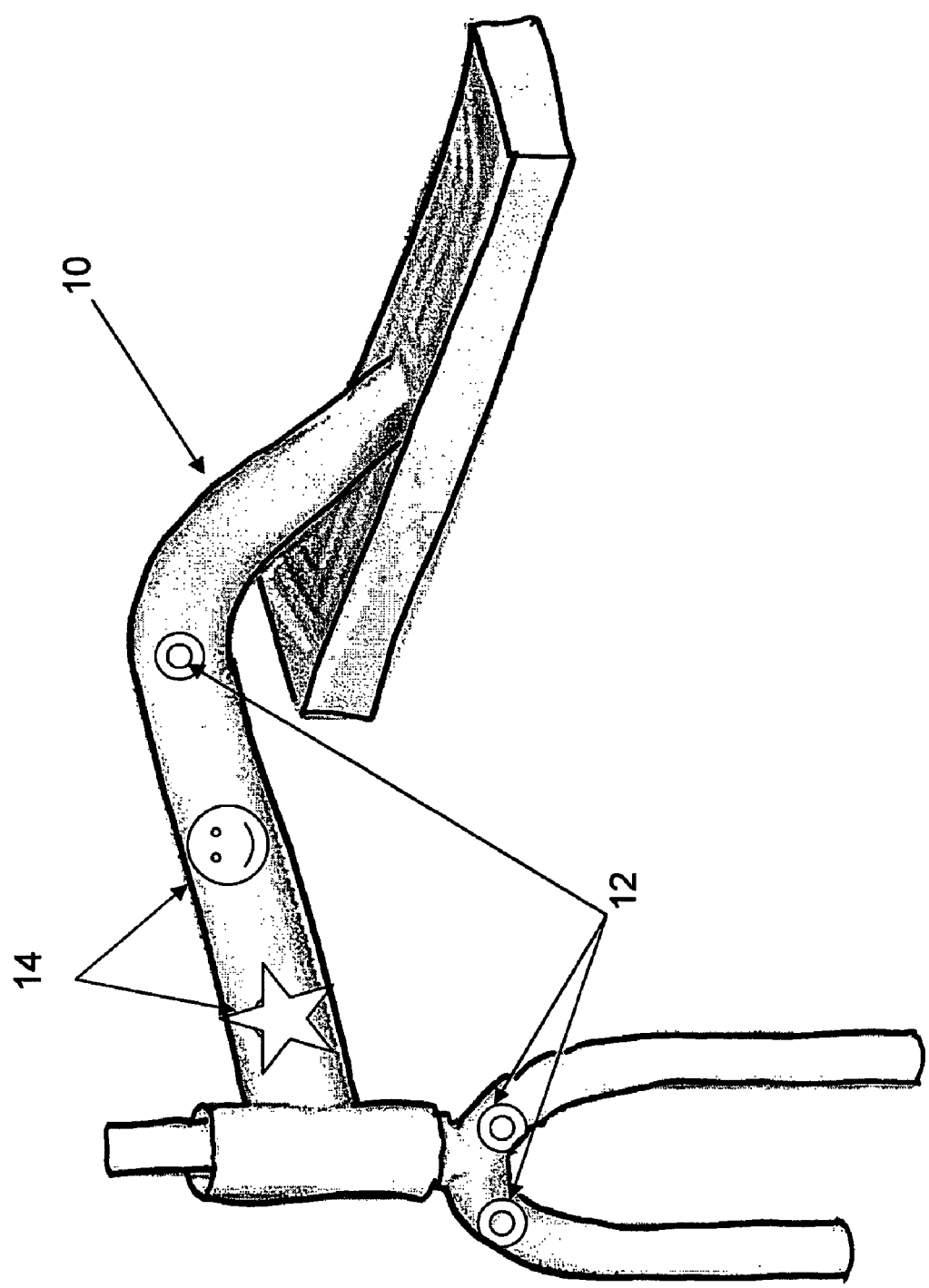
FIG. 1 illustrates one embodiment of the kits described in this application.

Referring to FIG. 1, a suitable bicycle frame 10 may be selected from any known frame such as, for example, a mountain bicycle frame, a road bicycle frame, or a tricycle frame. The frame may be made of any material commonly used in the art. Suitable examples include, but are not limited to, carbon fiber, steel, aluminum, titanium, or combinations thereof. In some embodiments, the frame may be made at least partially from a ferromagnetic material. In other embodiments, the frame may be at least partially coated with the ferromagnetic material. In yet other embodiments, a ferromagnetic material may be inserted into the bicycle frame. Suitable ferromagnetic materials include, but are not limited to, iron, cobalt, nickel, and combinations thereof.

Multiple attachment points 12 may be disposed along the frame. These attachment points are adopted to removably accept decals. In some embodiments, the attachment point may comprise a ferromagnetic material or be coated with a ferromagnetic material. In other embodiments, the attachment point may comprise a fastener such as, for example, a hook and loop fasteners, a snap fasteners, snap fit fasteners, or a zipper, among many others.

Decals 14 may be made of paper, plastic, sheet metal, foil, fabric, or combinations thereof. The decals may preferably include a decorative element such as images of cartoon characters, animals or objects, attractive patterns or designs, a combination of colors, a combination of textures or similar.

In some embodiment, a decal may comprise a white surface that can be customized by the user. For example, the surface of the decal may comprise a white board and a user can use markers or crayons to decorate it. In such embodiments, a coating may also be provided with the kit. After decorating the decal, a user may apply the coating to the surface of the decal in order to ensure that the decorations are preserved. Any type of known transparent coating may be used such as, for example, a lacquer or a varnish, among others.

Figure 1A:
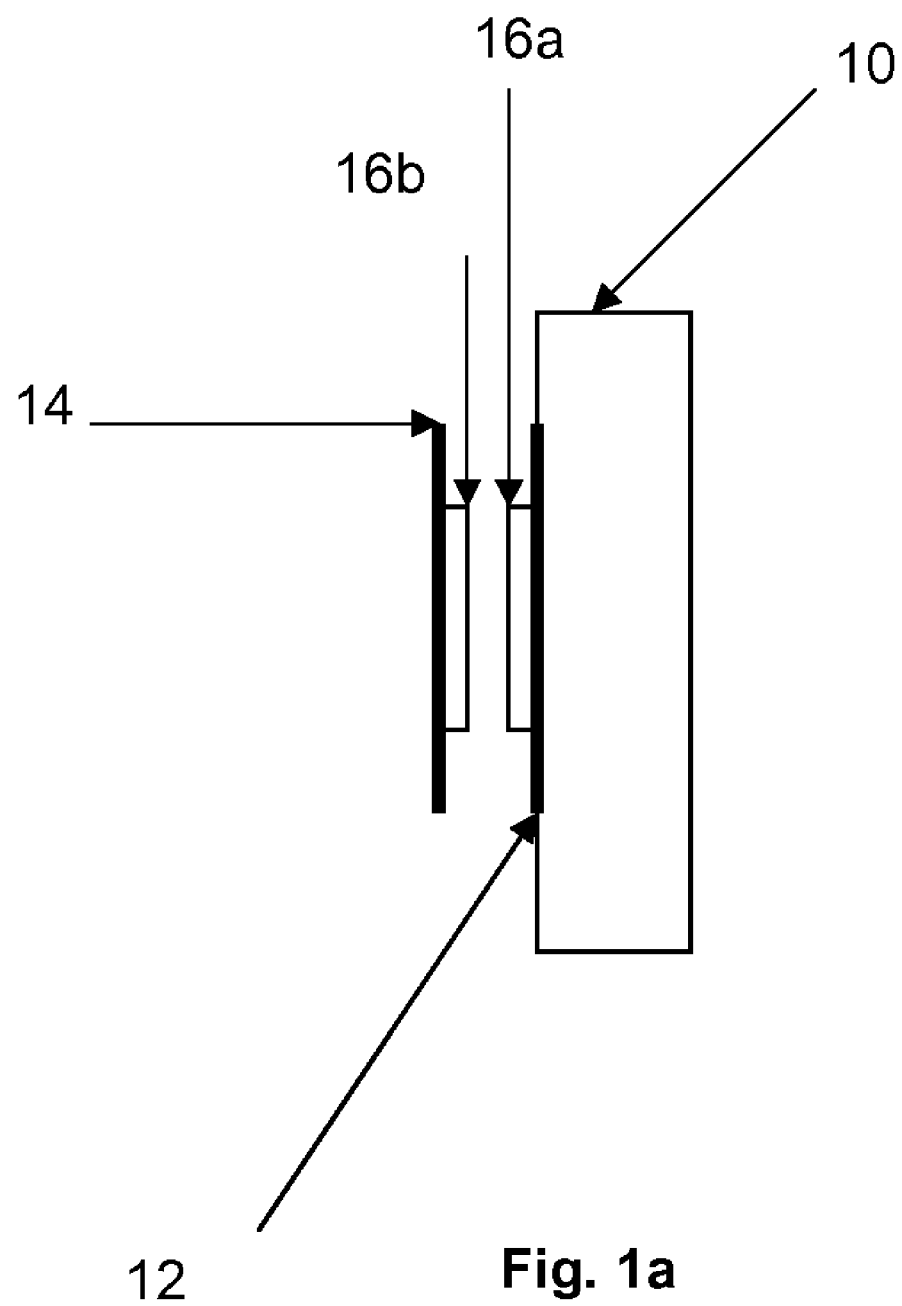
FIG. 1a is a side view of a decal attached to the frame at an attachment point in the embodiment of the invention of FIG. 1
Figure 2:
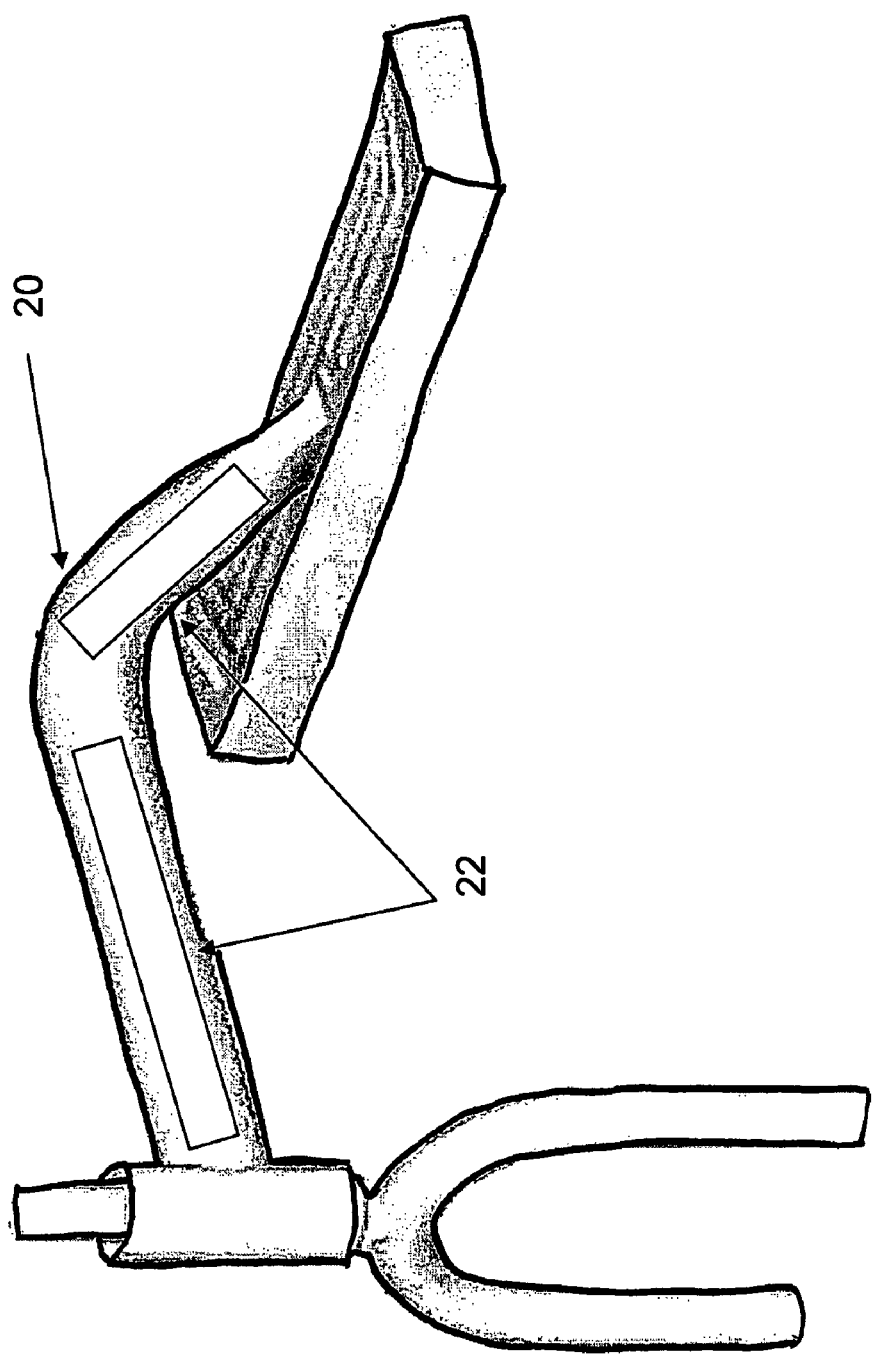
FIG. 2 illustrates alternative embodiment of the kits described herein.

The decals may be removably attached to the frame at the attachment points. In embodiment where the attachment point comprise a ferromagnetic material or is coated with a ferromagnetic material, the decal may comprise a magnet. In other embodiments where the attachment point 12 may comprise a fastener 16a, the decals 14 may comprise the fastener 16b complimentary to the attachment point fastener, as shown in FIG. 1a.

In another aspect, a kit for decorating a bicycle may comprise a bicycle frame, and a decorable surface affixed to the bicycle frame wherein the surface is adopted to receive removable decorations.

As described above, a bicycle frame 20 may comprise a frame for any type of bicycle. A decorable surface 22, adapted to accept removable decorations, may be affixed to the frame. In one embodiment, the decorable surface may be affixed to the frame permanently. For example, it may be welded, glued, or attached using fasteners to the frame. Other known method of attachment can also be used. Alternatively, the decorable surface may be removably affixed to the frame of the bicycle. The decorable surface can be attached to the frame using, for example, a hook and loop fasteners, a snap fasteners, snap fit fasteners, or a zipper, among many others. In some embodiments, the decorable surface may be wrapped over the frame.

The kit may also include crayons, paint, markers or similar devices for the user to decorate the surface. Accordingly, in such embodiments, the surface may be made of, for example, a white plastic sheet that can be decorated with supplied marking material. Preferably, the type of the sheet and the marking material is selected to enable the user to easily erase the decorations as desired. Alternatively, a coating may be provided to ensure that the decorations do not accidentally get erased.

In some embodiments, the kits described above may also include a decorable helmet. In some embodiments, the outside of the helmet may be left unpainted to allow the user himself or herself to paint or decorate the helmet. In other embodiments, decals may be provided which correspond to the decals to be attached to the bicycle frame as described above. Thus, a helmet may include attachment points, as described above, adopted to accept removable decorations. Preferably, the attachment points on the helmet are similar to the attachment points on the bike frame to allow the user to easily move the removable decals between the frame and the helmet if desired.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the following claims.

What is claimed is:

1. A kit for decorating a bicycle comprising:
  a decal comprising a whiteboard and a first fastener, wherein first fastener is directly disposed on said decal;
  a bicycle frame; and
  an attachment point disposed on the frame and comprising a second fastener complimentary to the first fastener and removeably attachable to the first fastener,
  wherein when the decal is attached to the bicycle frame at the attachment point, the decal in its entirety is conformal to the frame and is immediately adjacent to the second fastener.

2. The kit of claim 1, wherein the attachment point is formed by inserting a magnet inside the bicycle frame.

3. The kit of claim 1, wherein the attachment point is formed by using a ferromagnetic material to form the frame.

4. The kit of claim 1, wherein the attachment point is formed by coating the bicycle frame with a ferromagnetic material.

5. The kit of claim 1, wherein the decals are attached using fabric hook-and-loop fasteners.

6. The kit of claim 1 further comprising a decorable helmet.

7. A kit for decorating a bicycle comprising:
  a bicycle frame; and
  an erasable whiteboard surface directly affixed to the bicycle frame, the whiteboard surface being conformal to the frame and immediately adjacent to the frame in its entirety,
  wherein the surface is adopted to accept removable decorations.

8. The kit of claim 7 wherein the whiteboard surface is permanently attached to the bicycle frame.

9. The kit of claim 7 wherein the whiteboard surface is removeably attached to the bicycle frame.

10. The kit of claim 7 further comprising a decorable helmet.

11. The kit of claim 7 further comprising a decal and an attachment point disposed on the frame wherein the decal is adopted to be removeably attached to the bicycle frame at the attachment point.

12. The kit of claim 7 wherein the whiteboard surface is wrapped around the frame.

13. The kit of claim 7, wherein the whiteboard surface comprises a plastic sheet decorable with the marking material.

14. The kit of claim 7 further comprising a coating to be applied over the whiteboard surface to preserve the decorations.

* * * * *

UNITED STATES PATENT AND TRADEMARK OFFICE
CERTIFICATE OF CORRECTION

PATENT NO. : 8,230,627 B2  
APPLICATION NO. : 11/871734  
DATED : July 31, 2012  
INVENTOR(S) : Jonathan Soll et al.

Page 1 of 1

It is certified that error appears in the above-identified patent and that said Letters Patent is hereby corrected as shown below:

Title page, Item (76) Inventors: please delete "Johnathan" and replace it with --Jonathan--.

Signed and Sealed this  
Twenty-ninth Day of January, 2013

David J. Kappos  
*Director of the United States Patent and Trademark Office*